US008437692B2

United States Patent
Bella et al.

(10) Patent No.: US 8,437,692 B2
(45) Date of Patent: May 7, 2013

(54) RADIO COVERAGE EXTENDER FOR A PERSONAL AREA NETWORK NODE EMBEDDED IN A USER COMMUNICATIONS TERMINAL

(75) Inventors: Valter Bella, Turin (IT); Claudio Borean, Turin (IT); Fabio Luigi Bellifemine, Turin (IT); Giuliano Muratore, Rome (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/143,039

(22) PCT Filed: Dec. 30, 2008

(86) PCT No.: PCT/EP2008/068373
§ 371 (c)(1),
(2), (4) Date: Jun. 30, 2011

(87) PCT Pub. No.: WO2010/075897
PCT Pub. Date: Jul. 8, 2010

(65) Prior Publication Data
US 2011/0269397 A1 Nov. 3, 2011

(51) Int. Cl.
*H04B 7/15* (2006.01)
(52) U.S. Cl.
USPC .......................................... 455/11.1; 455/557
(58) Field of Classification Search ............... 455/556.1, 455/557, 558, 11.1, 13.1
See application file for complete search history.

(56) References Cited

U.S. PATENT DOCUMENTS

| 2003/0151600 A1* | 8/2003 | Takeuchi et al. ............... 345/204 |
| 2005/0070326 A1 | 3/2005 | Morton |
| 2005/0083971 A1* | 4/2005 | Delaney et al. ............... 370/466 |
| 2007/0213096 A1 | 9/2007 | Bella et al. |
| 2008/0004894 A1* | 1/2008 | Son et al. ........................... 705/1 |
| 2008/0200210 A1* | 8/2008 | Lim et al. ....................... 455/558 |
| 2008/0261656 A1 | 10/2008 | Bella et al. |
| 2010/0219453 A1* | 9/2010 | Kaunisto et al. ............... 257/213 |

FOREIGN PATENT DOCUMENTS

| EP | 1583375 A2 | 10/2005 |
| JP | 2005-261187 A | 9/2008 |
| WO | 01/95605 A | 12/2001 |
| WO | 02/052753 A1 | 7/2002 |
| WO | 2005/104584 A1 | 11/2005 |
| WO | 2006/056220 A1 | 6/2006 |
| WO | 2007/048052 A2 | 4/2007 |

OTHER PUBLICATIONS

International Search Report and Written Opinion mailed Oct. 12, 2009, PCT/EP2008/068373.

* cited by examiner

*Primary Examiner* — Tu X Nguyen
(74) *Attorney, Agent, or Firm* — Banner & Witcoff, Ltd.

(57) ABSTRACT

A radio coverage extender is provided for extending the radio range of a wireless network node embedded in a user terminal, for example a ZigBee node integrated on the SIM card of a mobile phone. The radio coverage extender may include: a radio signal repeater operable to receive radio signals from the wireless network node and to retransmit the received signals externally to the user terminal, and a power supply module operable to scavenge electrical energy from electromagnetic fields in which it happens to be immersed and to store the scavenged electrical energy for supplying the stored power to the radio signal repeater. The radio coverage extender is adapted to be included in a user terminal, for example it can be a flexible, pliable film attachable to a user terminal battery.

14 Claims, 7 Drawing Sheets

RADIO COVERAGE EXTENDER FOR A PERSONAL AREA NETWORK NODE EMBEDDED IN A USER COMMUNICATIONS TERMINAL

CROSS REFERENCE TO RELATED APPLICATIONS:

This is a U.S. National Phase Application under 35 U.S.C. 371 of International Application No. PCT/EP2008/068373, filed Dec. 29, 2008, which was published Under PCT Article 21(2), the entire contents of which are incorporated herein by reference.

BACKGROUND OF THE INVENTION

1. Field of the Invention

The present invention relates generally to the field of Personal Area Networks (PANs), in particular Wireless PANs (WPANs), and Wireless Sensor Networks (WSNs). More particularly, the present invention concerns a radio coverage extender for a WPAN or WSN node, like a ZigBee node, embedded in a user communications terminal such as a mobile phone, a smartphone or the like.

2. Description of the Related Art

WPANs, WSNs and similar networks are gaining importance because they allow offering a new breed of value-added services to users. Bluetooth (IEEE standard 802.15.1) and ZigBee (IEEE standard 802.15.4) are examples of standards for WPANs and WSNs that became popular in the last years.

In particular, ZigBee transceivers are regarded with interest because of their low power consumption and the capability of ZigBee nodes to self configure themselves in an "ad-hoc" network, thereby allowing an indirect transfer of data from a node to another. In addition to this, the possibility of integrating in a single chip both the analogue transceiver front-end and the functionalities for managing the complete communication protocol enables embedding ZigBee nodes within smart-card devices like Subscriber Identity Modules (SIMs) used in mobile communications terminals like mobile phones operable in GSM (General System for Mobile communications) and UMTS (Universal Mobile Telecommunications System) networks, and Multi Media Cards (MMCs).

The integration of wireless communication interfaces within SIM cards is already known in the art.

For example WO 01/95605 discloses a system including a SIM module with a conventional GSM SIM card connected to a Bluetooth slave unit, and a GSM terminal including a Bluetooth master unit. Communication of the SIM with the terminal takes place through the Bluetooth units.

EP 1738602 and EP 1815407 disclose a SIM card for a mobile terminal operable in a mobile network, the SIM card incorporating a radio transceiver module intended for communications that do not pass through the mobile network. In this way, a ZigBee-SIM (Z-SIM) is obtained, i.e. a SIM card that embeds a ZigBee node capable of interacting with WPANs and thus enabling offering new value-added services to the end user; moreover, the integration in the SIM card of a ZigBee node allows the user to maintain the connectivity functionalities to WPAN networks even when changing the mobile phone.

SUMMARY OF THE INVENTION

The Applicant has observed that the integration of WPAN or WSN nodes within user terminals, e.g. on smart cards to be used in conjunction with the user terminals, like SIM cards for the use in mobile phones, despite being advantageous under several respects, often poses problems of radio coverage. In a mobile phone, the SIM card is typically inserted in a slot that is located under the battery pack. The battery pack, as well other components parts of the mobile terminal, act as shields in respect of the electromagnetic field, and strongly attenuate the signals irradiated by, and/or which should be received by the WPAN node transceiver. Due to this, the radio coverage of the WPAN node embedded in the SIM card is strongly reduced.

The Applicant has tackled the problem of overcoming the reduction in radio coverage of a PAN node embedded in a smart card to be used in a user terminal.

Essentially, according to an aspect of the present invention, a radio coverage extender is provided for extending the radio range of a wireless network node embedded in a user terminal. The radio coverage extender is adapted to be included in the user terminal and comprises:

a radio signal repeater operable to receive radio signals from the wireless network node and to retransmit the received signals externally to the user terminal, and a power supply module operable to scavenge electrical energy from electromagnetic fields in which it happens to be immersed and to store the scavenged electrical energy for supplying the stored power to the radio signal repeater.

The power supply module may comprise a rectenna and a capacitor. Preferably, the capacitor is an ultra-capacitor, particularly a carbon nanotubes capacitor.

The radio coverage extender may comprise a further radio signal repeater operable to receive radio signals from outside the user terminal and to retransmit them to the wireless network node embedded in the user terminal.

The radio coverage extender may comprise a control unit configured to be operable to manage a network association of the radio coverage extender to the wireless network node embedded in the user terminal.

In particular, the control unit may be operable to:

looking for an existing network identified by a predetermined commissioning identifier being the commissioning identifier assigned to the network coordinated by the wireless network node embedded in the user terminal;

associating to the network identified by the commissioning identifier;

receiving from the wireless network node embedded in the user terminal operative parameters; and use the received operative parameters for associating to the wireless network node embedded in the user terminal.

In alternative, the control unit may be operable to:

looking for an existing network in a commissioning state;

when a network in a commissioning state is found, monitoring and comparing strengths of radio signals received from within the user terminal and of radio signals received from outside the user terminal, and if the radio signals received from within the user terminal are stronger than those received from outside the user terminal, associating with the network in the commissioning state.

Components of the radio coverage extender may be supported by a film attachable to a battery of the user terminal. The film is preferably flexible and pliable so as to allow it at least partially wrapping the battery.

The user terminal may in particular be a mobile phone. The wireless network node embedded in the user terminal may be a ZigBee node. The wireless network node may be embedded in a smart card used by the user terminal for its operation, particularly a SIM card.

According to another aspect of the present invention, a wireless network node system is provided adapted to be embedded in a user terminal; the wireless network node system comprises:

a wireless network node embedded in the user terminal, and a radio coverage extender adapted to be included in the user terminal and operable to extend the radio range of the wireless network node, the radio coverage extender being in accordance to the previous aspect of the invention.

Preferably, an ultracapacitor is provided on said smart-card for temporarily storing energy supplied by a user terminal battery for the supply of the smart card.

An advantage of the present invention resides in that the radio coverage extender does not require any modification to the hardware of the user terminal, of the smart card, and of the battery; it can be applied to user terminals already in use.

BRIEF DESCRIPTION OF THE DRAWINGS

These and other features and advantages of the present invention will be made apparent by the following detailed description of some embodiments thereof, provided merely by way of non-limitative examples; the following description will be best understood making reference to the attached drawings, wherein.

DETAILED DESCRIPTION OF EMBODIMENTS OF THE INVENTION

Figure 1:
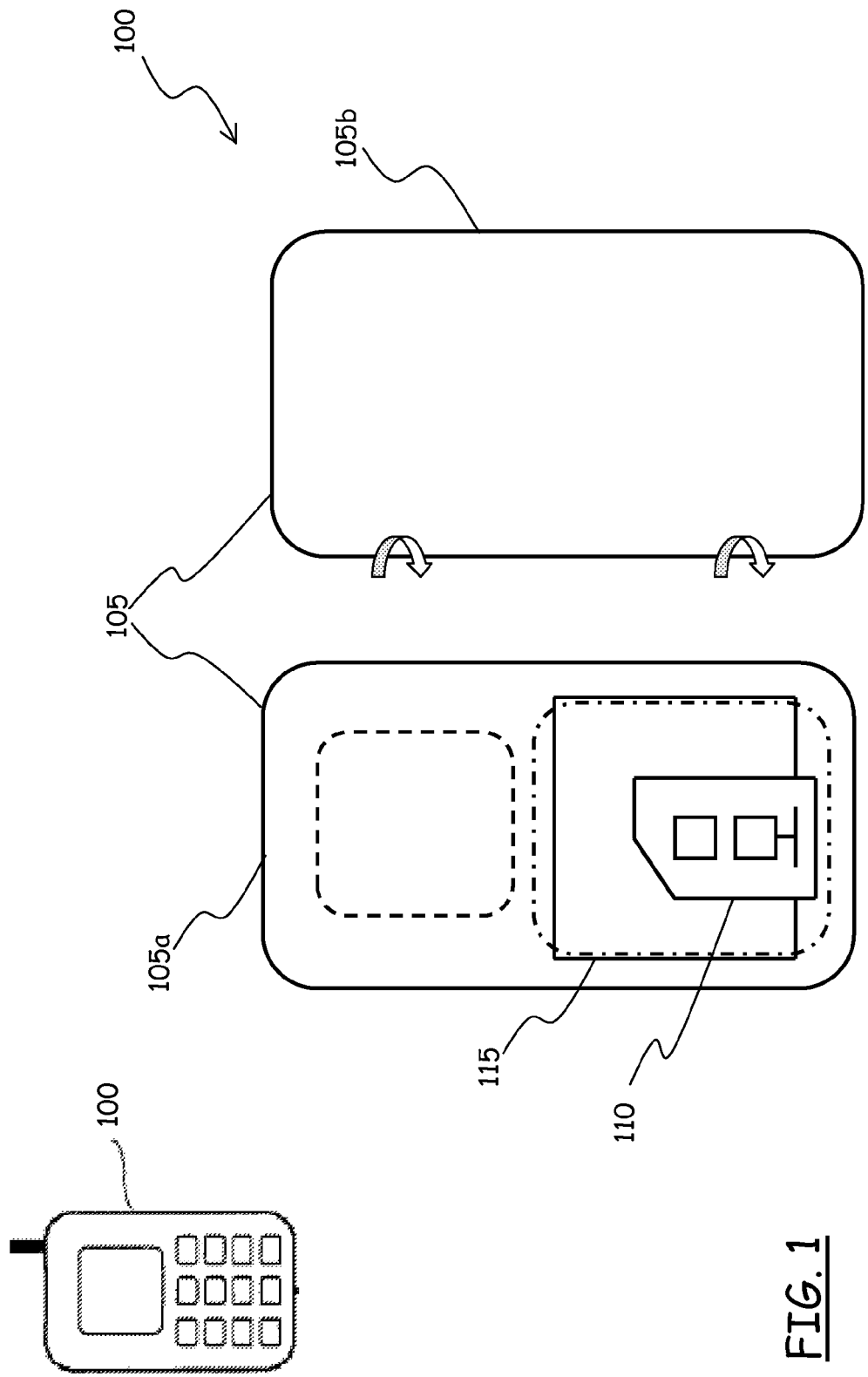
FIG. 1 schematically shows a user terminal, particularly a mobile phone, wherein a solution according to an embodiment of the present invention can be advantageously exploited.

Making reference to the drawings, in FIG. 1 there is schematically shown a user terminal 100 wherein a solution according to an embodiment of the present invention can be advantageously exploited. The user terminal 100 is in particular a handheld device, more particularly, in the considered example, a mobile phone or a smart phone operable in a mobile telephony network like a GSM network or a UMTS network. The mobile phone 100 comprises a casing 105 usually comprising a shell body 105a and a back cover 105b; within the casing 105 the internal components of the phone are accommodated; the mobile phone components are not shown nor will be described in detail, being per-se known; the mobile phone components comprises a radio transceiver for wirelessly communicating via the mobile telephony network, a control unit, a user interface comprising a display, a keyboard, a loudspeaker, a microphone. The mobile phone 100 operates in conjunction with a SIM card 110, which is a smart-card insertable in a slot provided in the mobile phone casing 105, and which is primarily devoted to authentication purposes of the subscriber in the mobile telephony network. The power supply necessary for the operation of the mobile phone 105 is provided by a battery 115, which is accommodated within the casing 105.

Typically, the SIM card 110, when inserted in the dedicated slot, is covered by the battery 115 on the back side of the casing 105, while on the casing front side the SIM card 110 is covered by the components of the mobile phone (e.g., the mobile phone electronics, the keyboard).

Figure 2:
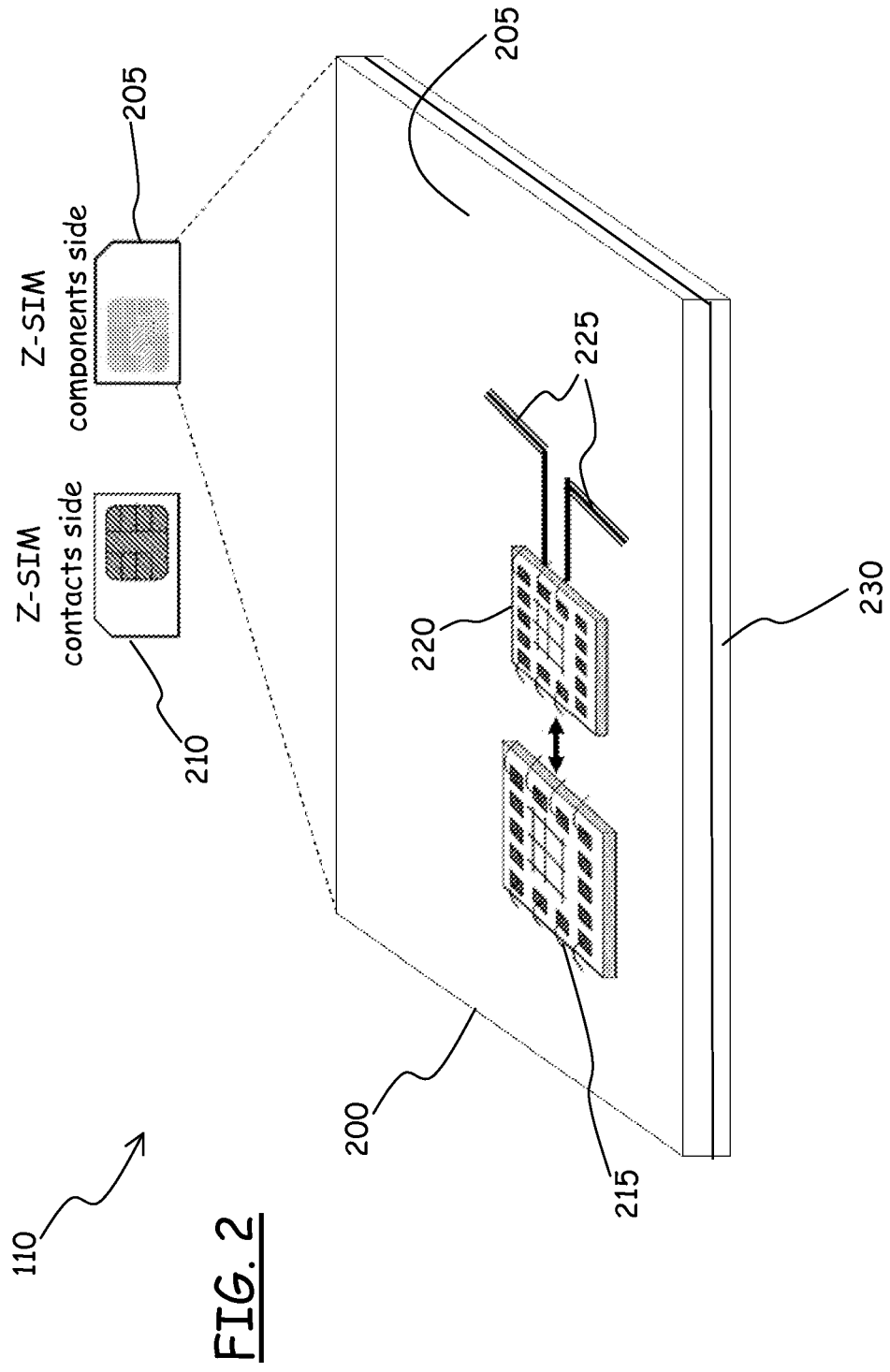
FIG. 2 pictorially shows a SIM card to be associated to the mobile phone of FIG. 1 and embedding a ZigBee node, according to an embodiment of the present invention.

The mobile phone 100 incorporates a WPAN or WSN node, particularly a ZigBee node. In particular, in the considered example the ZigBee node is embedded in the SIM card 110, as depicted in FIG. 2, so that the SIM becomes a Z-SIM. The Z-SIM card comprises a plastic board 200 which has a components card side 205 and a contacts card side 210 opposite to the components card side 205; the components card side 205 is the side of the card 110 to which a SIM chip 215 is attached; the contacts card side 210 is the side of the card 110 on which electrical contacts are provided adapted to contact corresponding contact terminals provided in the Z-SIM card slot of the mobile phone 110, for interacting with the mobile phone circuitry. To the components card side 205, a ZigBee chip 220 is also attached, and a ZigBee antenna 225 is formed. The ZigBee chip 220 interfaces with the SIM chip 215, so as to enable exploiting functionalities of the SIM chip 215 (for example, encryption functionalities) and of the mobile phone circuitry for, e.g., displaying to the user relevant information, and accepting user commands.

Details of the construction of the Z-SIM card 110 are provided in EP 1738602 and EP 1815407, which are incorporated herein by reference. Essentially, the ZigBee chip 220 comprises a RadioFrequency (RF) transmitter/receiver module or transceiver, a module for base-band signal processing and a microprocessor/microcontroller programmed to execute a management and control program for the ZigBee node functions.

It is pointed out that this is not to be construed as a limitation of the present invention, which applies as well in case the WPAN or WSN node is placed in another position of the mobile phone or, more generally, of the user terminal.

The provision of the ZigBee node in the mobile phone 100 enables the user to exploit the mobile phone to connect to WPANs or WSNs, and thus to enjoy new services in addition to those offered by a mobile telephony network. For example, an application resident on the mobile phone 100 (e.g., a Java applet that may be downloaded from a Web site of the mobile telephony network operator) may, after authenticating through the SIM, exploit the ZigBee node for activating a number of different services to the user.

As discussed in the foregoing, the integration of a WPAN or WSN node within a user terminal, particularly within the SIM card of a mobile phone, may pose problems of radio coverage of the WPAN or WSN node. Due to the usual location of the SIM card within a mobile phone, the mobile phone battery, as well as the other mobile phone components like the circuitry, act as shields in respect of, and thus strongly attenuate the radio signal irradiated by, and/or which should be received by the WPAN or WSN node. Due to this, the radio coverage of the WPAN or WSN node embedded in the SIM card is strongly reduced. Additional sources of radio coverage reduction may derive from the fact that the mobile phone may be kept in a bag, or in a pocket.

According to the present invention, a radio coverage extender is provided to enhance the radio coverage of the WPAN or WSN node incorporated in the mobile phone 100, particularly embedded in the SIM card 110.

Figures 3, 4:
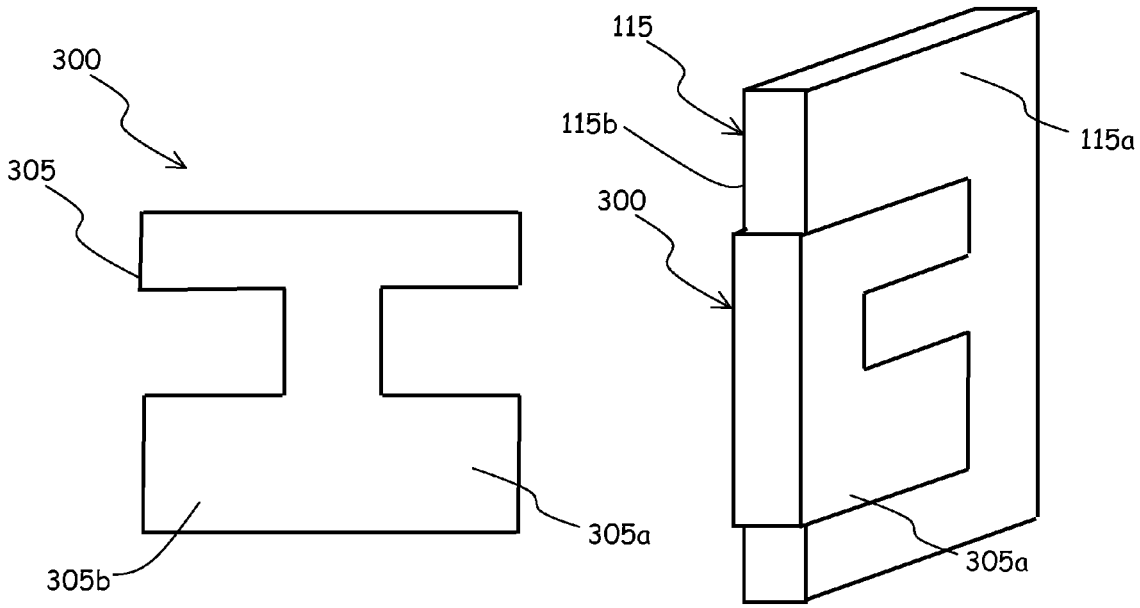
FIG. 3 schematically shows the external appearance of a radio coverage extender for the ZigBee node, according to an embodiment of the present invention.
FIG. 4 schematically shows the radio coverage extender of FIG. 3 attached to a mobile phone battery.

FIGS. 3 and 4 schematically show the external appearance of a radio coverage extender 300 according to an embodiment of the present invention. The radio coverage extender 300 takes the form of a flexible, pliable film 305, adapted to be folded and wrapped around the battery 115 in such a way that, when folded, it presents a first surface portion 305a located on an external battery side 115a (the side of the battery that, in use, faces the back of the mobile phone 100) and a second surface portion 305b located on an internal battery side 115b (the side of the battery that, in use, faces the SIM card 110). The film 305 may be provided, on the inner face thereof, with an adhesive so as to attach to the battery surface.

Figure 5:
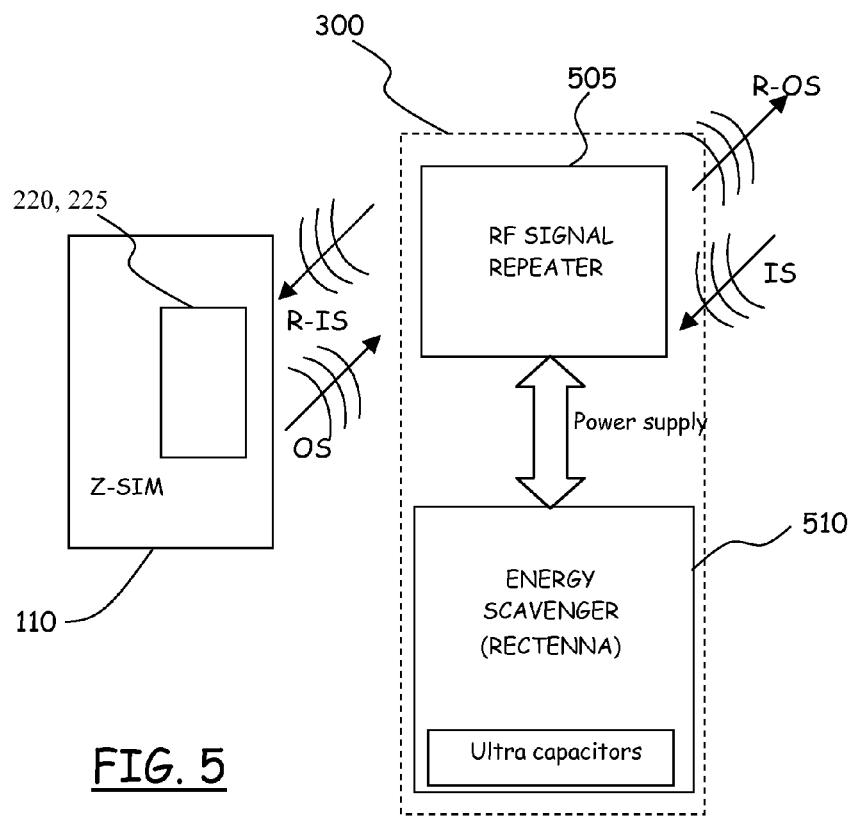
FIG. 5 is a schematic functional block diagram of the radio coverage extender according to an embodiment of the present invention.

FIG. 5 is a schematic functional block diagram of the radio coverage extender 300, in an embodiment of the present invention. Essentially, the radio coverage extender 300 comprises an RF signal repeater module 505 energized by an energy scavenger module 510. The RF signal repeater module 505 implements the functions of receiving RF signals OS (outgoing signals) irradiated by the ZigBee node integrated on the SIM card 110, particularly RF signals irradiated by the ZigBee antenna 225, and to retransmit them to the outside of the mobile phone 100 as repeated outgoing signals R-OS, and, preferably but not limitatively, receiving RF signals IS (incoming signals) irradiated by other nodes of a WPAN or WSN network, and retransmitting them as repeated incoming signals R-IS to the ZigBee node integrated on the SIM card 110. The RF signal repeater module 505 can also implement other functionalities, which will be described in detail later on, for managing the association of the radio coverage extender 300 to the ZigBee node integrated on the SIM card 110. The energy scavenger module 510 supplies power to the RF signal repeater module 505 by scavenging energy from the electromagnetic fields wherein it is immersed, and storing the scavenged energy.

Figure 6:
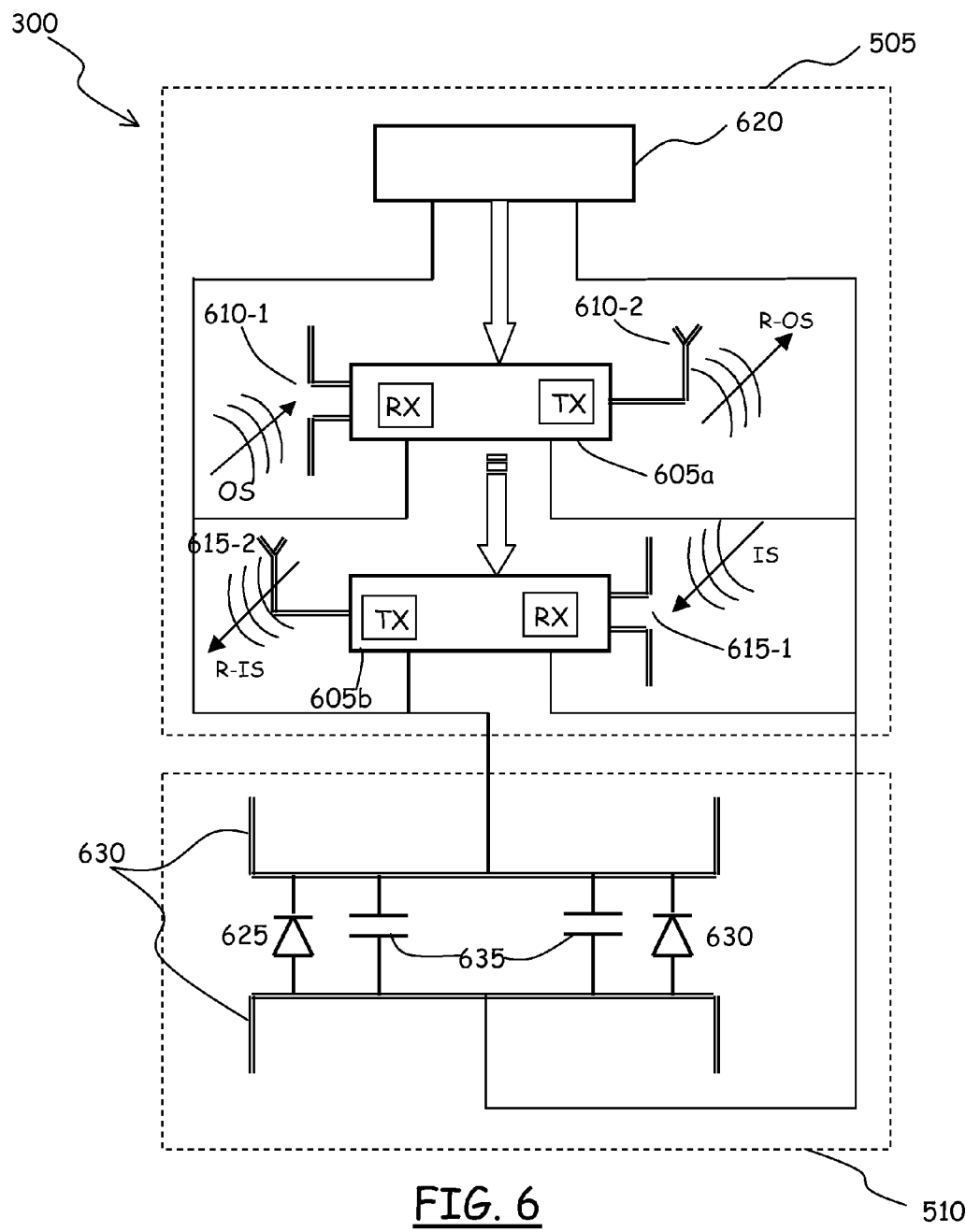
FIG. 6 depicts in greater detail the structure of the radio coverage extender, according to an embodiment of the present invention.

A more detailed picture of the structure of the radio coverage extender 300 is shown in FIG. 6. The RF signal repeater module 505 comprises a first simplex repeater 605a, operable to receive the outgoing RF signals OS irradiated by the ZigBee node, and to retransmit them to the outside of the mobile phone 100 as the repeated outgoing signals R-OS. Preferably, the RF signal repeater module 505 comprises a second simplex repeater 605b, operable to receive the incoming RF signals IS irradiated by other nodes of a WPAN or WSN network, and retransmitting them as the repeated incoming signals R-IS to the ZigBee node integrated on the SIM card 110. As generally known in the art of RF signals transmission, a simplex repeater is an electronic device that receives a signal and retransmits it at a higher level and/or higher power, or onto the other side of an obstruction, so that the signal can cover longer distances without degradation.

It is observed that, generally, major problems of radio coverage reduction of the ZigBee node integrated on the SIM card 110 due to shielding effects of the mobile phone components/battery are expected to be experienced in respect of the outgoing signals OS, due to the relatively limited RF power of the ZigBee node RF transceiver in the ZigBee chip 220: less problems should be experienced for the reception by the ZigBee node on the SIM card 110 of the incoming signals IS, thanks to the sensitivity of the ZigBee receiver, and also in view of the fact that the signals irradiated by other nodes of a WPAN or WSN, not embedded in user terminals, may be relatively strong. Thus, it might be sufficient to provide the radio coverage extender 300 with the first simplex repeater 605a. However, the provision of the second simplex repeater 650b may be useful for improving the performances of communication between two ZigBee nodes integrated in user terminals, e.g. in two mobile phones.

In particular, the first simplex repeater 605a is, from a layout viewpoint, structured in such a way that, when the pliable film 305 is applied to the battery 115, the RF receiver RX of the repeater, and the associated antenna 610-1, are located on the internal battery side 115b that faces the SIM card 110, whereas the RF transmitter TX of the repeater, and the associated antenna 610-2, are located on the external battery side 115a facing the back of the mobile phone 100. Analogously, the second simplex repeater 605b layout is such that, when the film 305 is applied to the battery 115, the RF receiver RX of the repeater, and the associated antenna 615-1, are located on the external battery side 115a, whereas the RF transmitter TX of the repeater, and the associated antenna 615-2, are located on the internal battery side 115b.

The RF signal repeater module 505 also comprises a control unit 620, e.g. a microprocessor/microcontroller, operable to execute a control program/firmware, for controlling the operation of the simplex repeaters 605a, 605b and for implementing other functionalities, described later on, for managing the association of the radio coverage extender 300 to the ZigBee node integrated on the SIM card 110.

The energy scavenger module 510 harvests energy from the electromagnetic fields in which it is immersed, stores it and supplies power to the RF signal repeater module 505. In an embodiment of the present invention, the energy scavenger module 510 comprises a rectifying antenna or "rectenna"; as known in the art, a rectenna is a type of antenna that is capable of directly converting microwave energy into DC (Direct Current) electricity. A rectenna can for example be constructed from one diode or diodes 625 placed between dipoles of an antenna 630. The diode(s) rectifies the current induced in the antenna by the microwaves. Schottky diodes are preferred because they have low voltage drop and high speed, and therefore waste a low amount of power due to conduction and switching. The antenna 630 may have elements arranged in a multi-element phased array with a mesh pattern reflector element to make it directional; the layout of the antenna 630 is preferably such as to extend essentially across all the width of the film 305, so as to be able to capture electromagnetic field waves from both the inside and the outside of the mobile phone 100. The energy harvested by the rectenna is stored in one or more capacitors 635. According to a preferred invention embodiment, the capacitor(s) 635 is an ultra-capacitor. An ultra-capacitor, also known as super-capacitor, is a capacitor having a much higher energy density compared to common capacitors, typically of the order of thousands of times greater than a high-capacity electrolytic capacitor. In particular, in a preferred invention embodiment, the ultra-capacitor 635 is a carbon nanotubes capacitor, which can take the form of a thin, light, flexible film.

From a construction viewpoint, the antennas 610-1, 610-2, 615-1 and 615-2 may have greater dimensions compared to the Zigbee antenna 225 present on the SIM card 110, in order to achieve a significant radio coverage even exploiting relatively modest transmission power. One or both of the antennas 610-1 and 615-1, and the antenna 630 may also be realized as a unique antenna; also the antenna 615-2 may in principle be realized as a single antenna with either the antenna 610-1, or the antenna 630, or both. However forming them as separate, distinct antennas allows tailoring their design depending on their function; for example, the design of the antenna 630 should be optimized for efficiently harvesting the electromagnetic field irradiated by the circuitry of the mobile phone 100, which typically transmits at power levels substantially higher than those of the ZigBee node. Additionally, forming distinct antennas allow adopting layouts adapted to limit the mutual interference of the antennas which, in use, are located on different sides of the battery. The antenna 630 may also be realized as two antennas, one in use located on the inner side of the battery, the other on the outer side; this allows optimizing the antenna on the inner battery side not only for harvesting energy from the surrounding electromagnetic field, but also for performing the functions of the antenna 615-2.

The flexible film 305 making up the radio coverage extender 300 can be manually attached to the battery directly by the mobile phone user; care should be taken to respect the proper disposition of the film 305: the first surface portion 305a should be attached to the external battery side 115a and the second surface portion 305b to the internal battery side 115b, so as to fully exploit the optimized design of the components of the radio coverage extender 300; however, an accidental misplacement does not have dramatic consequences, and does not impair the radio coverage extender functionalities. Alternatively, the film 305 making up the radio coverage extender 300 can be attached to the battery directly by the battery manufacturer, as a label.

Thanks to its limited cost, two or more radio coverage extenders may also be applied to the battery.

In operation, the radio coverage extender 300 behaves as a node of a WPAN or WSN, particularly like a ZigBee node, and, as mentioned in the foregoing, the control unit 620 of the RF signal repeater module 505 controls the association of the radio coverage extender 300 to the ZigBee node embedded in the mobile phone 100.

Hereinafter, two exemplary techniques for the association of the radio coverage extender 300 to the ZigBee node within the mobile phone will be described.

When not associated with any ZigBee network, the radio coverage extender 300 may be in a hibernation, low power consumption state (the energy scavenger module 510 is however always active, so as to keep the ultra-capacitor 635 charged). The radio coverage extender 300 periodically wakes up for ascertaining the presence of any ZigBee signal. The radio coverage extender 300 may also be activated by the ZigBee node in the mobile phone, for example by sending an activation code that induces in the energy scavenger module 510 corresponding variations of voltage across the capacitor 635; these voltage variations are detected by the control unit 620, which as a consequence activates the radio coverage extender 300.

Figure 7:
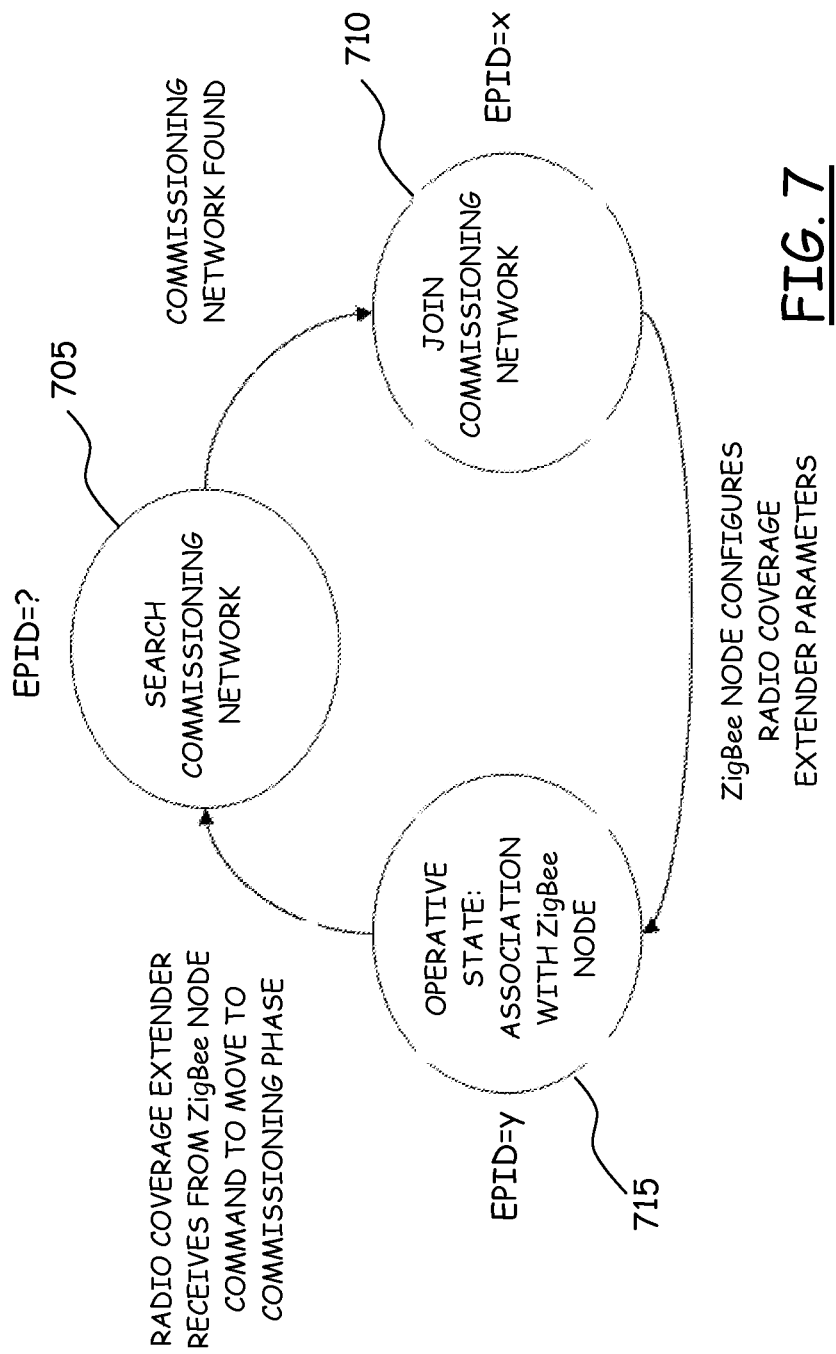
FIG. 7 is a state-transition diagram of a procedure for the association of the radio coverage extender to the ZigBee node embedded in the mobile phone, according to an embodiment of the present invention.
Figure 8:
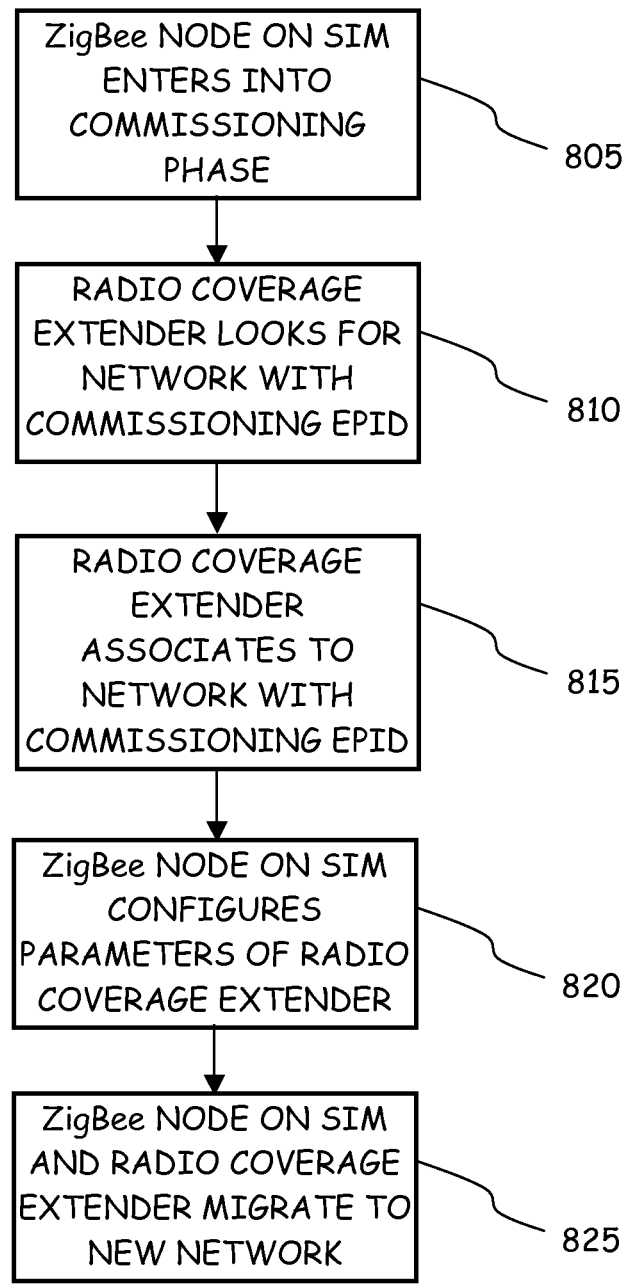
FIG. 8 is a schematic flowchart of the association procedure of FIG. 7.

Making reference to the state-transition diagram of FIG. 7 and the flowchart of FIG. 8, according to a first association technique, the radio coverage extender 300 is adapted to perform a self-configuration procedure. When the ZigBee node embedded in the mobile phone is activated, it enters into a commissioning phase (block 805) in which it behaves as a coordinator of a ZigBee network (a ZigBee network coordinator is a ZigBee node that sets up the network, is aware of all the nodes within its network, and manages both the information about each node as well as the information that is being transmitted/received within the network) with a predetermined Extended PAN Identifier (EPID), the "commissioning EPID"; the EPID is a globally unique PAN identifier of the network coordinated by the network coordinator (and is used to avoid PAN ID conflicts between distinct networks). When the radio coverage extender 300 is activated, for example when it wakes up it performs a scan in search of the available networks, and, if any network is found, it looks for the network having the predetermined commissioning EPID (EPID=x in FIG. 7; state 705, and block 810). Once the radio coverage extender 300 finds the network with the commissioning EPID (which is the network coordinated by the ZigBee node embedded in the mobile phone), the radio coverage extender 300 provisionally associates to such network (state 710 and block 815). The ZigBee node in the mobile phone can now configure the radio coverage extender with the necessary operation parameters (block 820), such as a new, operative EPID (EPID=y in FIG. 7) that will be used from then on, the communication channels to be exploited, the security level, possibly a network key to be used. Preferably, the radio coverage range of the radio coverage extender 300 is deliberately reduced in the commissioning phase, so as to avoid the possibility that the radio coverage extender 300 gets associated with an external network possibly in a commissioning state; the dynamic setting of the radio coverage range may be achieved by dynamically varying the transmission power of repeaters in the radio coverage extender; the transmission power may be dynamically changed by varying a binary code stored in registers of the control unit 620 which set the desired transmission power, as well as a transmission power sweep from a starting transmission power to a final transmission power (these registers are normally present in ZigBee nodes).

After the radio coverage extender 300 has been configured by the ZigBee node embedded in the mobile phone, both the nodes migrate to the new network (state 715 and block 825), having the operative EPID (EPID=y) communicated to the radio coverage extender by the ZigBee node on the SIM card. The radio coverage of the radio coverage extender 300 is restored to its full capacity.

In case the ZigBee node embedded in the mobile phone is required to operate as a signal router of a ZigBee network, for example in order to set up a peer-to-peer communication with other mobile phones/user terminals having embedded therein ZigBee nodes, the ZigBee node in the mobile phone 100 may issue a reconfiguration command to the radio coverage extender 300, so as to bring it back to the commissioning phase (transition from state 715 to state 705); the radio coverage extender 300 will consequently restart searching an available network having the commissioning EPID. Once the radio coverage extender finds such a network, which is again the network coordinated by the ZigBee node in the mobile phone, the latter reconfigures the radio coverage extender 300 with the proper parameters for making it operate in the new network.

A second possible technique for the association of the radio coverage extender 300 to the ZigBee node in the mobile phone (instead of another network) is the following.

Figure 9:
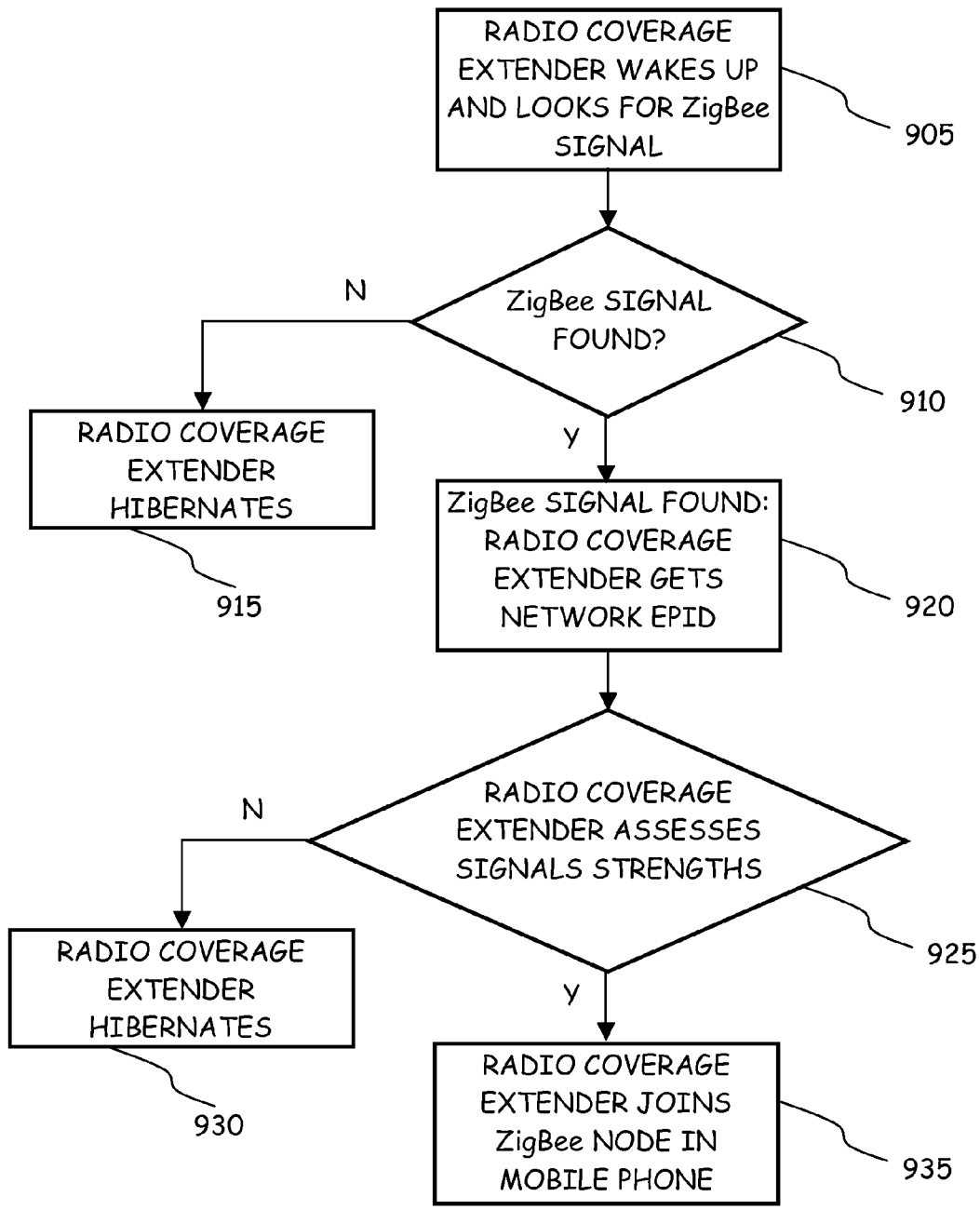
FIG. 9 is a schematic flowchart of another association procedure according to an embodiment of the present invention.

Making reference to the flowchart of FIG. 9, when the radio coverage extender 300 is activated, e.g. when it wakes up, it listens for the reception of a ZigBee signal (block 905). If no ZigBee signal is detected (block 910, exit branch N), the radio coverage extender returns to the hibernation state (block 915). If a ZigBee signal is found (block 910, exit branch Y), the radio coverage extender 300 gets the network EPID (block 920). The radio coverage extender 300 then assesses whether the signal received by the antenna 615-1 is, synchronously with the reception of the EPID and for the whole ZigBee transmission during the commissioning phase, constantly present and of significantly lower strength compared to the signal received by the antenna 610-1 (block 925). In the negative case, i.e. if the above condition is not satisfied (block 925, exit branch N), the radio coverage extender returns to the hibernation state (block 930). If the above condition is satisfied (block 925, exit branch Y), the radio coverage extender 300 understands that the ZigBee transmission is from the ZigBee node in the mobile phone, and associates with the latter, storing the proper configuration parameters (block 935).

Once the radio coverage extender 300 has associated to the ZigBee node in the mobile phone, the former becomes an RF signal repeater for the ZigBee node.

In addition to harvesting energy from the electromagnetic fields present during transmission/reception of signals by the ZigBee node in the mobile phone, and when the mobile phone is communicating over the mobile telephony network, the re-charge of the ultra-capacitor 635 of the radio coverage extender 300 may be directly managed by the ZigBee node on the SIM card. For example, the ZigBee node may generate a carrier wave; unless a collision avoidance algorithm is exploited, during the recharge of the ultra-capacitor the ZigBee node cannot receive signals from external nodes, and the carrier wave used for recharging the ultra-capacitor may cause external networks to suffer interference. Another technique may call for the ZigBee node in the mobile phone to transmit dummy data (for example, a sequence of application-level packets generated using the CSMA/CA mechanism of the ZigBee standard).

The solution according to the present invention allows the radio coverage of a ZigBee node embedded in a user terminal to be significantly enhanced. Additionally, thanks to the presence of the radio coverage extender, the transmission power of the ZigBee node in the mobile phone can be reduced.

According to a preferred embodiment of the present invention, in order to reduce the peak current drainage of the ZigBee chip 220 from the battery 115, and thus to reduce the overall SIM card peak current drainage (which, according to the standards, shall not exceed 50 mA), an ultra-capacitor may be integrated on the SIM card 110 to provide a temporary storage of energy. In particular, the ultra-capacitor may take the form of a thin film 230 that is attached to the SIM card 110

The present invention, albeit described making reference to a ZigBee node, is applicable in general to any WPAN or WSN node.

The present invention has been here presented considering some exemplary embodiments thereof. Individual features discussed in connection with one or more of the described embodiments may be combined with the features of any of the other embodiments. Several changes to the described embodiments are also possible, as well as other embodiments which, albeit not described in detail, fall in the protection scope of the appended claims.

The invention claimed is:

1. A radio coverage extender comprising:
    a radio signal repeater operable to receive radio signals from a wireless network node embedded in a user terminal and to retransmit the received signals to outside of the user terminal; and
    a power supply module operable to scavenge electrical energy from electromagnetic fields in which the power supply module happens to be immersed and to store the scavenged electrical energy for supplying stored power to the radio signal repeater,
    the radio coverage extender being adapted to be included in the user terminal.

2. The radio coverage extender of claim 1, wherein the power supply module comprises a rectenna and a capacitor.

3. The radio coverage extender of claim 2, wherein the capacitor is an ultra-capacitor in the form of a carbon nanotubes capacitor.

4. The radio coverage extender of claim 1, comprising a further radio signal repeater operable to receive radio signals from outside the user terminal and to retransmit the radio signals to the wireless network node embedded in the user terminal.

5. The radio coverage extender of claim 1, further comprising a control unit configured to be operable to manage a network association of the radio coverage extender to the wireless network node embedded in the user terminal.

6. The radio coverage extender of claim 5, wherein said control unit is operable to:
    search for an existing network identified by a predetermined commissioning identifier assigned to the network coordinated by the wireless network node embedded in the user terminal;
    associate to the network identified by the commissioning identifier;
    receive operative parameters from the wireless network node embedded in the user terminal; and
    use the received operative parameters for associating to the wireless network node embedded in the user terminal.

7. The radio coverage extender of claim 5, wherein said control unit is operable to:
    search for an existing network in a commissioning state;
    when a network in a commissioning state is found, monitor and compare strengths of radio signals received from within the user terminal and of radio signals received from outside the user terminal, and
    if the radio signals received from within the user terminal are stronger than those received from outside the user terminal, associate with the network in the commissioning state.

8. The radio coverage extender of claim 1, wherein components thereof are supported by a film attachable to a battery of the user terminal.

9. The radio coverage extender of claim 8, wherein said film is flexible and pliable so as to allow the film to at least partially wrap the battery.

10. The radio coverage extender of claim 1, wherein the user terminal is a mobile phone.

11. The radio coverage extender of claim 1, wherein the wireless network node embedded in the user terminal is a ZigBee node.

12. The radio coverage extender of claim 1, wherein the wireless network node is embedded in a SIM card used by the user terminal for its operation.

13. A wireless network node system adapted to be embedded in a user terminal, the wireless network node system comprising:
    a wireless network node embedded in the user terminal, and
    a radio coverage extender adapted to be included in the user terminal and operable to extend the radio range of the wireless network node,
    wherein the radio coverage extender comprises:
        a radio signal repeater operable to receive radio signals from the wireless network node embedded in the user terminal and to retransmit the received signals to outside of the user terminal; and
        a power supply module operable to scavenge electrical energy from electromagnetic fields in which the power supply module happens to be immersed and to store the scavenged electrical energy for supplying stored power to the radio signal repeater.

14. The wireless network node system of claim 13, wherein the user terminal is a mobile phone, and an ultracapacitor is provided on a smart-card for temporarily storing energy supplied by a user terminal battery for the supply of the smart card.

* * * * *